March 16, 1943.  H. T. HALLOWELL  2,314,274
SELF-LOCKING SET SCREW
Filed May 23, 1939
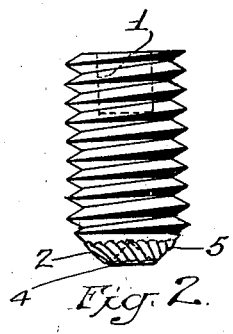
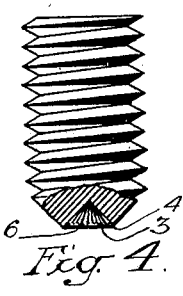
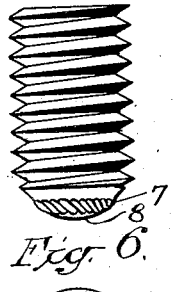
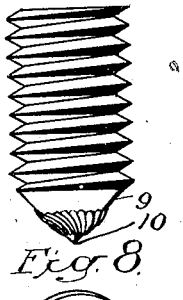
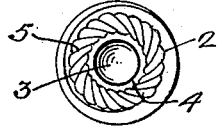
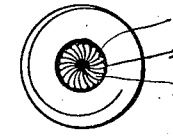
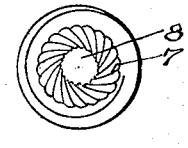
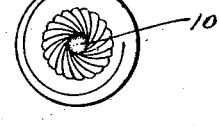
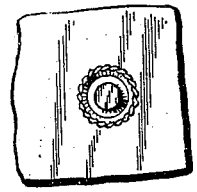
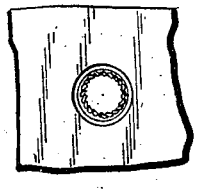
Inventor.
Howard T. Hallowell
by his Attorneys
Howson & Howson Patented Mar. 16, 1943

2,314,274

UNITED STATES PATENT OFFICE 2,314,274

SELF-LOCKING SETSCREW

Howard T. Hallowell, Jenkintown, Pa., assignor to Standard Pressed Steel Co., Jenkintown, Pa., a corporation of Pennsylvania Application May 23, 1939, Serial No. 275,262

3 Claims. (Cl. 151—32)

This invention relates to improvements in self-locking set screws, and more particularly to improvements in screws of the type wherein the self-locking function is derived from modifications in the normal form of the tip or work-engaging extremity of the screw.

It has been proposed, for example, to knurl the work-engaging end of a set screw, or to otherwise provide the end with projections or recesses which, when the screw is tightened against the work, impress themselves in or interlock with the work, this interlocking being operative to prevent the screw from subsequently turning about its axis and thereby loosening. With this type of self-locking screw, I have found it of advantage to provide the work-engaging extremity with centering means that will be effective to establish the position of the screw with the work prior to engagement of the interlocking means, to thereby insure a more accurate and efficient operation of said latter means and to preclude any tendency of the tip of the screw when initially engaged to creep transversely upon the work from the intended position.

A principal object of the invention, therefore, is to provide a self-locking screw of the stated type which in its initial contact with the work will function, after the manner of the prior conventional screws lacking the self-locking feature, to accurately locate itself in the desired position with respect to the work, and which after this position has been established will lock itself securely in position.

Still more specifically, an object of the invention is to provide a screw of the stated type wherein the extreme work-engaging tip, arranged symmetrically with respect to the longitudinal axis of the screw, shall be free from the small projections or recesses which function as described above to interlock the screw with the work, said interlocking means being located in a position closely adjoining the said tip and being effective with respect to the work only after the extreme tip portion has entered and has positively established the location of the screw in the work.

The invention will be more readily understood by reference to the attached drawing, wherein:

Figure 1 is a side elevational view of a known type of hollow or socketed set screw made in accordance with my invention;

Fig. 2 is an inverted plan view of the screw shown in Fig. 1;

Fig. 3 is a side elevational and partial sectional view illustrating a modification of my invention;

Fig. 4 is an inverted plan view of the screw shown in Fig. 3;

Fig. 5 is a side elevational view of another well-known type of set screw provided with locking means in accordance with my invention;

Fig. 6 is an inverted plan view of the screw shown in Fig. 5;

Fig. 7 is a view of still another form of set screw incorporating my invention;

Fig. 8 is an inverted plan view of the set screw shown in Fig. 7;

Figs. 9, 10, 11 and 12 are views showing the patterns of the impressions formed by the working tips of the screws shown respectively in Figs. 1, 3, 5 and 7, and Figs. 13 and 14 are sectional views illustrating the functional characteristics of a screw made in accordance with the invention.

With reference to Figs. 1 and 2 of the drawing, the screw therein illustrated is a conventional type of hollow set screw comprising at one end a wrench-receiving socket 1, indicated in broken lines, and at the other or working end a tip 2 of frusto-conical external form, the extremity of the tip being formed with a countersunk recess 3 which affords at the extremity an annular work-engaging rib 4 which is concentric with the longitudinal axis of the screw. This rib of a character to embed itself in the work when the screw is tightened to thereby securely anchor the screw in the work and to preclude relative movement between the work and the member in which the screw is threaded.

In accordance with my invention, the outer conical surface of the tip is provided with a plurality of small rib-like projections 5 formed, in the present instance, by knurling, although it will be understood that the projections may take a variety of forms and may be produced by means other than knurling. In accordance with the invention, these projections are removed from the extreme terminal end of the screw, represented in the present instance by the apex of the rib 4, so that the said apex remains unmodified and in the form of a smooth annulus. In tightening this screw against the work and as shown in Fig. 13, the initial effect is to slightly embed the concentric apex of the rib in the work surface, thereby positively establishing the position of the screw with respect to the work. By reason of the concentricity of the rib with the axis of the screw, the thrust of the rib against the work is in the true axial direction, and is entirely free from any side thrust which might result in the aforedescribed creeping of the screw on the work. As the tightening of the screw against the work continues and subsequent to the embedment of the rib apex in the work as described, the projections 5 on the outer conical surface are brought into compressive engagement with the surface of the work, and by interlocking themselves in said surface create a relation of the screw with the work which positively resists any rotation of the screw about its axis tending to release the screw from the work. This relation of screw and work is shown in Fig. 14. When a screw of this character is forcibly released from the work, it is found that the impression of the work-engaging tip of the screw against the work is a true and accurate pattern of the screw tip, see Figure 9, indicating the accuracy with which the screw engages with the work and the efficiency of the interlocking engagement. Since the interlocking projections on the screw take effect only after the initial embedment of the screw tip in the work, the mutilative effect of the projections is reduced to a minimum, without, however, any loss in the efficiency of the interlocking engagement.

In the embodiment of the invention shown in Figs. 3 and 4, which involves a screw of the same character as that shown in Figs. 1 and 2, the small interlocking projections, indicated in this instance by the reference numeral 6, are located on the surface of the countersunk recess 3 instead of, as in the previous embodiment, upon the outer surface of the conical tip. As in the previous embodiment, the interlocking projections are slightly removed from the extreme apex of the work-engaging rib 4 formed, as previously described, at the juncture of the outer conical surface with the surface of the recess, so that the initial engagement of the screw with the work is confined entirely to the smooth concentric apex of the rib. By this means, the same functional effect as described above is obtained, the pattern of the indentation made by the tip of the screw with the work being illustrated in Figure 10.

In Figs. 5 and 6, my invention is illustrated in its application to the conventional round nose set screw, and in this instance, the interlocking projections 7 are so located on the tip that the extreme convex end 8 of the tip is left unmodified for initial engagement with the work. In tightening this screw against the work, the smooth axially disposed extremity 8 impresses itself in the work to thereby initially accurately and positively locate the screw, and the embedment of the interlocking projections occurs subsequently and only after the screw has been thus positively located. The pattern of the indentation formed by the screw in the work in this instance is shown in Figure 11.

In the embodiment of the invention shown in Figs. 7 and 8, the work-engaging tip 9 of the screw is conical in form, and the apex 10 of the cone is left free of the interlocking projections, so that this tip may initially impress itself in the work before engagement and embedment of the said projections.

It will be apparent that the invention in principle may find other embodiments than those illustrated herein, and that it is applicable to other types of set screw than that shown. It will be understood further that the interlocking formations may take various forms other than those illustrated, and that they may be produced in various ways other than knurling without departure from the invention.

I claim:

1. A self-locking set screw having a frusto-conical working tip and having in the outer end of said tip an axially disposed cavity with inwardly convergent walls defining the inner face of a terminal rib and adapted when the screw is turned home to upset the work metal and to thereby embed itself in the work, at least one side face of said rib being formed so as to provide a circumferential series of small channels adapted to receive the said upset work metal to establish an interlock between the work and said tip, said channels terminating at points short of and in proximity to the outer terminal edge of said rib.

2. A self-locking set screw having a frusto-conical working tip, the end of said tip having an axially disposed cavity with inwardly convergent walls defining the inner side face of a terminal rib adapted when the screw is turned home to upset the work metal and to thereby embed itself in the work, at least one side face of said rib being knurled and thereby exhibiting a circumferential series of ribs and recesses each extending in a direction to intersect a cross-sectional plane normal to the longitudinal axis of the screw, said knurls terminating at points short of and in proximity to the outer terminal edge of said rib.

3. A self-locking set screw having a working tip, and an axially disposed cavity in the end of said tip defining the inner side face of a terminal rib adapted when the screw is turned home to upset the work metal and to thereby embed itself in the work, at least one side face of said rib being formed to provide therein a circumferential series of small channels each extending in a direction to intersect a cross-sectional plane normal to the longitudinal axis of the screw and adapted to receive the said upset work metal to establish an interlock between the work and said tip, the peripheral portions of the tip separating said channels being substantially non-cutting with respect to the work and said channels terminating at points short of and in proximity to the outer terminal edge of said rib.

HOWARD T. HALLOWELL.